(12) United States Patent
McBeath et al.

(10) Patent No.: US 8,194,696 B2
(45) Date of Patent: Jun. 5, 2012

(54) METHOD AND APPARATUS FOR SCHEDULING AN ACKNOWLEDGEMENT TRANSMISSION

(75) Inventors: Sean M. McBeath, Keller, TX (US); Danny T. Pinckley, Arlington, TX (US); John D. Reed, Arlington, TX (US); Jack A. Smith, Valley View, TX (US)

(73) Assignee: Motorola Mobility, Inc., Libertyville, IL (US)

( * ) Notice: Subject to any disclaimer, the term of this patent is extended or adjusted under 35 U.S.C. 154(b) by 1367 days.

(21) Appl. No.: 11/625,380

(22) Filed: Jan. 22, 2007

(65) Prior Publication Data

US 2007/0211620 A1 Sep. 13, 2007

Related U.S. Application Data

(60) Provisional application No. 60/781,565, filed on Mar. 10, 2006.

(51) Int. Cl.
*H04L 12/43* (2006.01)
(52) U.S. Cl. ........ 370/458; 370/345; 370/254; 370/485; 370/321; 370/473; 370/410; 370/209; 370/260; 455/562.2; 455/434; 455/464

(58) Field of Classification Search .................. 370/410, 370/522, 338, 345, 254, 485, 321, 320, 473, 370/209; 455/562.2, 434, 464; 375/260
See application file for complete search history.

(56) References Cited

U.S. PATENT DOCUMENTS

| | | | |
|---|---|---|---|
| 4,918,690 A | 4/1990 | Markkula et al. | |
| 6,148,211 A | 11/2000 | Reed et al. | |
| 2002/0064167 A1 * | 5/2002 | Khan et al. | 370/410 |
| 2002/0080750 A1 | 6/2002 | Belcea | |
| 2003/0199272 A1 | 10/2003 | Shvodian et al. | |
| 2005/0201319 A1 * | 9/2005 | Lee et al. | 370/321 |
| 2008/0095071 A1 * | 4/2008 | Lu et al. | 370/254 |

FOREIGN PATENT DOCUMENTS

GB 2374761 A 10/2002

* cited by examiner

*Primary Examiner* — Patrick Edouard
*Assistant Examiner* — Fred Casca (57) ABSTRACT

A communication system distributes, in the time domain, acknowledgment transmissions by a group of access terminals sharing a same time domain resource. A position of one or more access terminals in the group of access terminals is determined and each of the one or more access terminals then sends an acknowledgment transmission, such as an acknowledgment or negative acknowledgement, in a time slot that is N time slots after the shared time domain resource, where N is a function of the position of the access terminal in the group of access terminals.

28 Claims, 6 Drawing Sheets

FIG. 6

METHOD AND APPARATUS FOR SCHEDULING AN ACKNOWLEDGEMENT TRANSMISSION

CROSS-REFERENCE TO RELATED APPLICATION

This application claims priority from provisional application Ser. No. 60/781,565, entitled "METHOD AND APPARATUS FOR SCHEDULING AN ACKNOWLEDGEMENT TRANSMISSION," filed Mar. 10, 2006, which is commonly owned and incorporated herein by reference in its entirety.

FIELD OF THE INVENTION

The present invention relates generally to wireless communication systems and, in particular, to the provision of acknowledgements in a wireless communication system.

BACKGROUND OF THE INVENTION

Presently, an access network (AN), or equivalently a base station, can transmit data to an access terminal (AT) by concatenating multiple contiguous time slots for transmission of a particular packet. For such a transmission, the AT buffers the data in the multiple contiguous time slots before decoding the packet. For system employing hybrid automatic repeat request (HARQ), the AT will send an acknowledgment (ACK) or negative acknowledgment (NAK) indication to the AN in a time slot that is a predetermined number of time slots after the last time slot of the multiple contiguous time slots. If multiple ATs share the same set of multiple contiguous slots, then each AT will transmit its ACK/NAK information in the same slot. Unfortunately, if all ATs transmit their ACK/NAK information in the same time slot, then there is an imbalance in the power received at the AN in the time domain. In particular, there is excessive interference in the time slot where the group of ATs transmit their ACK/NAK information.

This is particularly problematic when multiple low data rate service users share a time domain resource. Examples of such services include voice over internet protocol (VoIP), real time messaging, and gaming. For example, it is likely that 128 VoIP users could share the same time domain resource. In this case, it becomes highly undesirable for all 128 VoIP users to transmit their ACK/NAK information in the same time slot.

Thus, there is a need for a method and apparatus for distributing the ACK/NAK transmissions by a group of ATs in the time domain.

DETAILED DESCRIPTION OF THE INVENTION

To address the need for a method and apparatus for distributing acknowledgment transmissions, such as ACK/NAK transmissions, by a group of access terminals in the time domain, a communication system is provided that distributes, in the time domain, acknowledgment transmissions by a group of access terminals sharing a same time domain resource. A position of one or more access terminals in the group of access terminals is determined and each of the one or more access terminals then sends an acknowledgment transmission, such as an acknowledgment or negative acknowledgement, in a time slot that is N time slots after the shared time domain resource, where N is a function of the position of the access terminal in the group of access terminals.

Generally, an embodiment of the present invention encompasses a method for transmitting an acknowledgement. The method includes determining a position of an access terminal (AT) in a group of access terminals (ATs) sharing a same time domain resource and sending an acknowledgment or negative acknowledgment indication in a time slot that is N time slots after the shared time domain resource, where N is a function of the position of the AT in the group of ATs.

Another embodiment of the present invention encompasses a method for receiving acknowledgement transmissions. The method includes determining when to expect an acknowledgement or negative acknowledgment transmission based on one or more of a position of an AT in a group of ATs sharing a same time domain resource and a function used at the AT and decoding the acknowledgment or negative acknowledgement transmission from the AT only in an expected time slot.

Yet another embodiment of the present invention encompasses a method for distributing acknowledgment transmissions. The method includes determining a processing capability of the access terminal, assigning the AT a position in a group of ATs such that the AT has enough processing time to decode a transmission before transmitting an acknowledgment or a negative acknowledgement, and sending the access terminal an indication of the access terminal's position in the group of ATs.

Still another embodiment of the present invention encompasses an AT comprising a processor configured to determine a position of the AT in a group of ATs sharing a same time domain resource and send an acknowledgment or negative acknowledgement indication in a time slot that is N time slots after the shared time domain resource, where N is a function of the position of the AT in the group of ATs.

Yet another embodiment of the present invention encompasses an access network (AN) element that determines when to expect an acknowledgement or negative acknowledgment transmission based on one or more of a position of an AT in a group of ATs sharing the same at least one contiguous time slot and a function used at the AT and decodes the acknowledgment or negative acknowledgement transmission from the AT only in an expected time slot.

Still another embodiment of the present invention encompasses a network controller that distributes acknowledgment transmissions, wherein the network controller determines a processing capability of the access terminal, assigns the access terminal a position in a group of access terminals such that the access terminal has enough processing time to decode a transmission before transmitting an acknowledgment or a negative acknowledgement, and sends the access terminal an indication of the access terminal's position in the group of access terminals.

Figure 1:
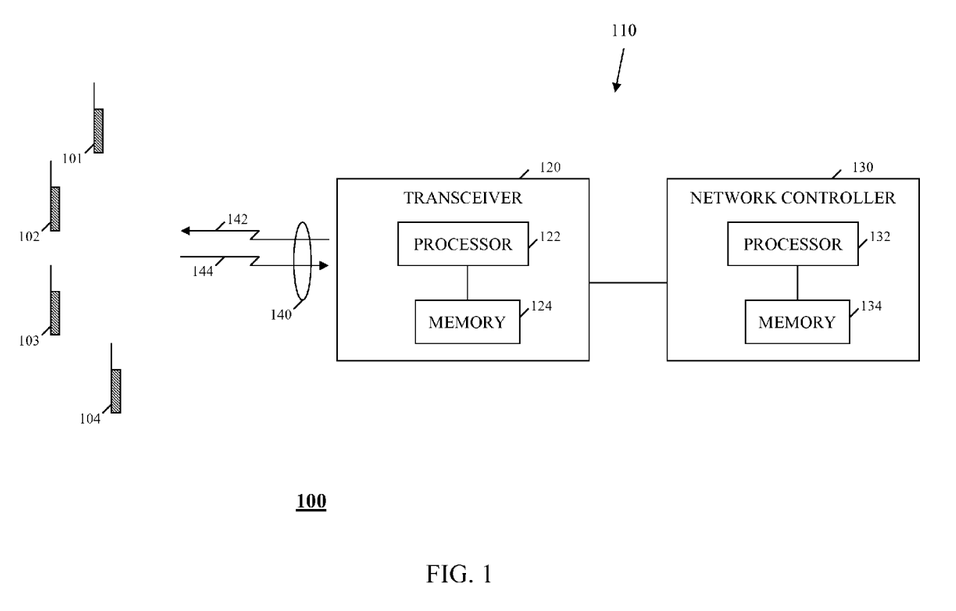
FIG. 1 is a block diagram of a wireless communication system in accordance an embodiment of the present invention.

Turning now to the drawings, the present invention may be more fully described with reference to FIGS. 1-6. FIG. 1 is a block diagram of a wireless communication system 100 in accordance with an embodiment of the present invention. Communication system 100 includes multiple access terminals (ATs) 101-104 (four shown), for example but not limited to a cellular telephone, a radio telephone, a personal digital assistant (PDA) with radio frequency (RF) capabilities, a wireless modem that provides an RF interface for digital terminal equipment (DTE) such as a laptop computer, or any other device that is capable of sending and receiving communication signals on a wireless network. In various embodiments of the present invention, ATs 101-104 may be referred to as a mobile station (MS), subscriber unit (SU), or user equipment (UE). Communication system 100 further includes a wireless access network (AN) 110 comprising at least one wireless transceiver 120 (one shown), such as a Base Transceiver Station (BTS) or Node B, in communication with a network controller 130, such as a Base Station Controller (BSC) or a Radio Network Controller (RNC), wherein each of transceiver 120 and network controller 130 may be referred to as an element of the AN. However, in other embodiments of the present invention, network controller 130 may be located outside of AN 110, for example, may comprise a Mobile Switching Center (MSC), a Packet Control Function (PCF), or a Packet Data Serving Node (PDSN).

AN 110 provides communications services to MSs, such as MSs 101-104, located in a coverage area, such as a cell or sector, serviced by the AN via an air interface 140. Air interface 140 comprises a downlink 142 and an uplink 144 that each includes multiple radio frequency (RF) resources, that is, RF communication channels. Forward link 142 preferably includes a paging channel, at least one forward link pilot channel, at least one forward link control channel, at least one forward link broadcast channel, and at least one forward link traffic channel. Reverse link 144 preferably includes a reverse link access channel, at least one reverse link control channel, and at least one reverse link traffic channel.

Each of transceiver 120 and network controller 130 includes a respective processor 122, 132, such as one or more microprocessors, microcontrollers, digital signal processors (DSPs), combinations thereof or such other devices known to those having ordinary skill in the art. The particular operations/functions of processors 122 and 132, and respectively thus of transceiver 120 and controller 130, are determined by an execution of software instructions and routines that are stored in a respective at least one memory device 124, 134 associated with the processor, such as random access memory (RAM), dynamic random access memory (DRAM), and/or read only memory (ROM) or equivalents thereof, that store data and programs that may be executed by the corresponding processor. However, one of ordinary skill in the art realizes that the operations/functions of each of processors 122 and 132 alternatively may be implemented in hardware, for example, integrated circuits (ICs), application specific integrated circuits (ASICs), a programmable logic device such as a PLD, PLA, FPGA or PAL, and the like, implemented in the transceiver or network controller. Based on the present disclosure, one skilled in the art will be readily capable of producing and implementing such software and/or hardware without undo experimentation. Further, the particular operations/functions specified herein as being performed by AN 110 may be performed by network controller 130 regardless of whether or not the network controller is included in the AN, by transceiver 120, or may be distributed between the transceiver and the network controller.

Figure 2:
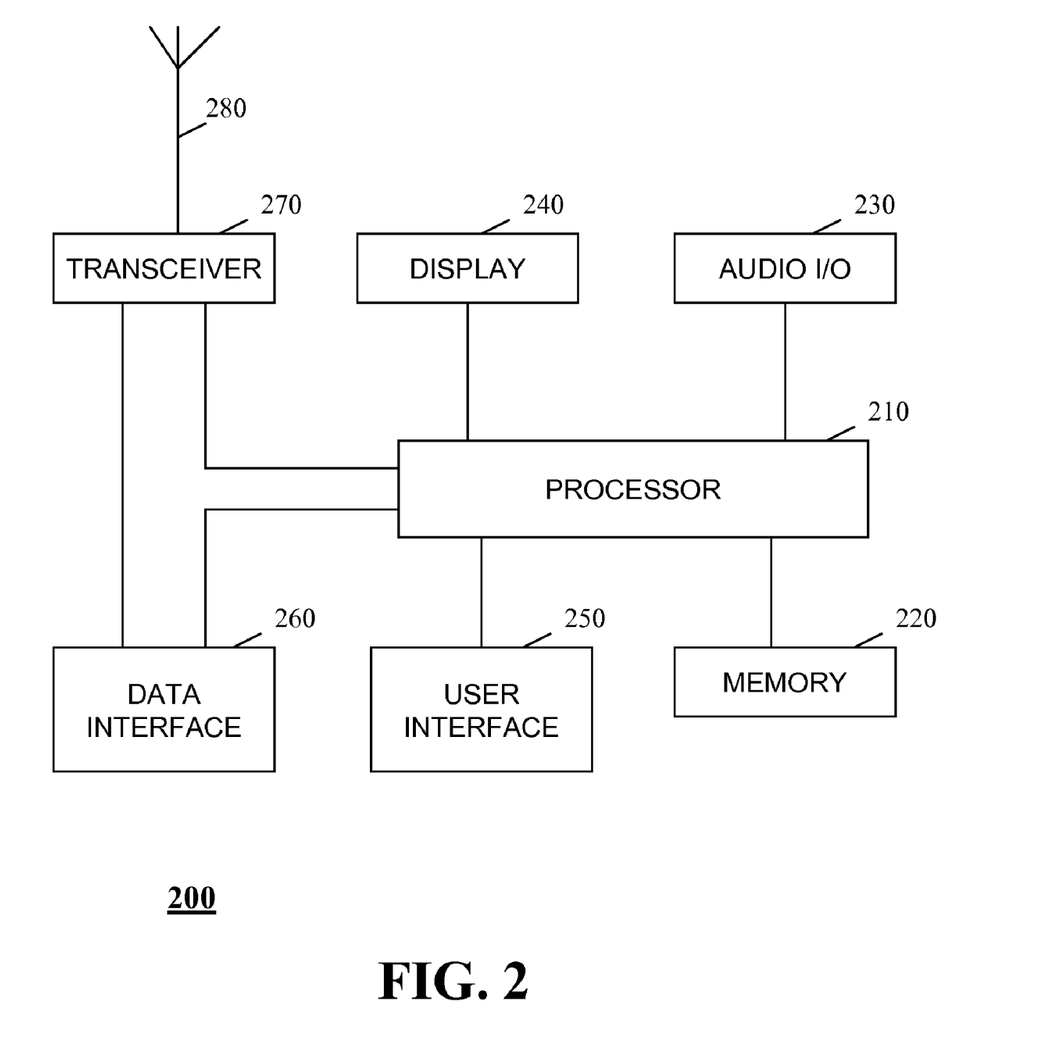
FIG. 2 is a block diagram of an access terminal in accordance with various embodiments of the present invention.

Referring now to FIG. 2, a block diagram of an AT 200, such as ATs 101-104, is depicted in accordance with various embodiments of the present invention. AT 200 includes a processor 210 such as one or more microprocessors, microcontrollers, digital signal processors (DSPs), combinations thereof or such other devices known to those having ordinary skill in the art. The particular operations/functions of processor 210, and respectively thus of AT 200, are determined by an execution of software instructions and routines that are stored in a respective at least one memory device 220 associated with the processor, such as random access memory (RAM), dynamic random access memory (DRAM), and/or read only memory (ROM) or equivalents thereof, that store data and programs that may be executed by the corresponding processor. However, one of ordinary skill in the art realizes that the operations/functions of processor 210 alternatively may be implemented in hardware, for example, integrated circuits (ICs), application specific integrated circuits (ASICs), a programmable logic device such as a PLD, PLA, FPGA or PAL, and the like, implemented in the AT. Based on the present disclosure, one skilled in the art will be readily capable of producing and implementing such software and/or hardware without undo experimentation.

AT 200 may further include any one or more of audio input and output circuitry 230 coupled to processor 210, a display 240 coupled to the processor, a transceiver 270 coupled to the processor, a user interface 250 coupled to the processor, and an antenna 280 coupled to the transceiver. AT 200 may also include a data interface device 260 coupled to each of processor 210 and transceiver 270 for receiving and sending data from and to external data communications devices, for example, computers. Display 240 may comprise a liquid crystal display (LCD), a light emitting diode (LED) display, a plasma display, or any other means for displaying information. Transceiver 250 may include a transmitter and/or a receiver configured to receive a control channel. Audio input and output circuitry 230 may include a microphone, a speaker, a transducer, or any other audio input and output circuitry. User interface 250 may include a keypad, buttons, a touch pad, a joystick, an additional display, or any other device useful for providing an interface between a user and an electronic device.

In various embodiments of the present invention, processor 210 may decode control channels, broadcast channels, traffic channels, multiple user packets, or the like. Processor 210 may further process such channels when it finds its unique identifier, possibly embedded as part of a control channel, broadcast channel, multiple user packet, or the like. The unique identifier can be a mobile communication device or access terminal identification number, a subscriber identity, or any other identifier that can be used to uniquely identify an AT. For example, the unique identifier can be a medium access control index (MAC Index). Alternatively, the unique identifier can be the combination of a group identifier which is assigned to the AT and a unique identifier which is valid only in within the group. Processor 210 of AT 200 may then decode or otherwise process packets or other forms of data or control information associated with the assigned, unique identifier.

Communication system 100 comprises a wideband packet data communication system that employs an Orthogonal Frequency Division Multiplexing (OFDM) modulation scheme for transmitting data over air interface 140. Preferably, communication system 100 is an Orthogonal Frequency Division Multiple Access (OFDMA) communication system, wherein a frequency bandwidth is split into multiple frequency sub-bands, or groups of subcarriers, that comprise the physical layer channels over which traffic and signaling channels are transmitted simultaneously. A user may then be assigned one or more of the frequency sub-bands for an exchange of user information. Multiple users can be assigned the same sub-band, using various known multiplexing schemes, such as CDMA, TDMA, FDMA, SDMA, and multiple user packets. Preferably, communication system 100 is an OFDMA based evolution of the CDMA 2000 1XEV-DO (1X Evolution Data Optimized) system that operates in accordance with the 3GPP2 and TIA/EIA (Telecommunications Industry Association/Electronic Industries Association) IS-856 and 3GPP2 C.S0024 standards, which provide compatibility standards for CDMA 2000 1XEV-DO systems. To ensure compatibility, radio system parameters and call processing procedures are specified by the standards, including call processing steps that are executed by an AT and an access network serving the AT and between the access network and associated infrastructure in order to establish a call or execute a handoff. However, those who are of ordinary skill in the art realize that communication system 100 may operate in accordance with any wireless telecommunication system employing an Orthogonal Frequency Division Multiplexing (OFDM) modulation scheme, such as a 3GPP (Third Generation Partnership Project) E-UTRA (Evolutionary UMTS Terrestrial Radio Access) communication system, a Wireless Local Area Network (WLAN) communication system as described by the IEEE (Institute of Electrical and Electronics Engineers) 802.xx standards, for example, the 802.11a/HiperLAN2, 802.11g, or 802.16 standards, or any of multiple proposed ultrawideband (UWB) communication systems.

Communication system 100 provides for a multiplexing of user data intended for multiple ATs in a same time domain resource, such as one or more contiguous time slots that may or may not have a repeating pattern. For example, the assigned time domain resources may comprise an interlace pattern of time slots. As part of the multiplexing of data associated with multiple ATs in the same time domain resource, AN 110, and more particularly network controller 130, establishes a group of ATs, such as ATs 101-104, that share the time domain resource. Each member of the group may be identified by a unique identifier associated with the AT, such as a mobile communication device or access terminal identification number, a subscriber identity, or any other identifier that can be used to uniquely identify an AT. For example, the unique identifier can be a medium access control index (MAC Index). In another embodiment of the present invention, the unique identifier can be the combination of a group identifier which is assigned to the AT and a unique identifier which is valid only in within the group.

In addition to establishing the group of ATs, AN 110, that is, network controller 130, assigns to one or more ATs of the group of ATs 101-104, such as AT 101, a portion of the shared time domain resource for conveyance of user data to the AT via the shared time domain resource. For example, network controller 130 may assign each of the one or more ATs to one of multiple Walsh codes, where the multiple Walsh codes occupy the time domain resource and a corresponding frequency domain resource. By way of another example, network controller 130 may assign each of the one or more ATs to a subset of a set of subcarriers that occupies the time domain resource. By way of yet another example, network controller 130 may assign each of the one or more ATs to a multiple user packet, where data for the at least one user is concatenated prior to encoding. The multiple user packet may also include a header, which is concatenated to the data prior to encoding, containing the unique identifiers of each of the one or more ATs in the multiple user packet. The header may also contain additional control information, including the length of the packet for each of the one or more ATs. By assigning a portion of the shared time domain resource, such as a Walsh code, to one or more ATs sharing the time domain resource, such ATs may receive data that is transmitted along with data intended for other ATs in the same time domain resource.

For each AT that is a member of the group and that is assigned a portion of the shared time domain resource, AN 110, and in particular network controller 130 via transceiver 120 and forward link 142, conveys to the AT information concerning the group assignment, the assigned shared time domain communication resource, and the portion of the shared time domain resource assigned to the AT. The group assignment, the assigned shared time domain resource, and the portion of the shared time domain resource assigned to the AT may be conveyed to the AT together in one or more messages, or may be separately conveyed to the AT in separate messages, via a control channel of forward link 142. Also, each of the group assignment, the assigned shared time domain resource, and the portion of the shared time domain resource assigned to the AT may be conveyed to the ATs individually, or may be conveyed to the ATs in one or more messages intended for all members of the group.

For example, AN 110 may send the unique identifier of an AT, such as AT 101, the time domain resource assignment and possibly other assignments for the AT, such as a frequency domain resource assignment, and the assigned portion of the time domain resource using a shared or dedicated control channel of forward link 142. By way of another example, AN 110 may send a list of unique identifiers for the group of ATs 101-104, the time domain resource assignment and possibly other assignments, and the assigned portions of the time domain resource to the group of ATs using a shared control channel of forward link 142.

The control channel of forward link 142 used to convey the time domain resource assignment may be any channel used to carry information about a traffic channel. For example, the control channel may be on a different Walsh code, in a different time slot, in a different orthogonal frequency division multiplexing (OFDM) symbol time, or in a different set of OFDM subcarriers, or may be sent as a preamble to the traffic channel or as a header to a multiple user packet, or may comprise a combination of any of the above, or the like. Further, the control channel can be transmitted concurrently with user data intended for one or more of ATs 101-104 or in a previous time slot or previous group of time slots. If the control channel is in a previous time slot, AN 110 may indicate in which time slot the shared time domain resource will begin or the AN and AT can agree on a starting position for the shared time domain resource relative to the control channel in advance. When each AT 101-104 receives the group assignment, the shared time domain resource assignment, and information concerning any portion of the shared time domain resource assigned to the AT, the AT may then store the assignments and information in the at least one memory device 220 of the AT.

When each AT that is a member of the group of ATs 101-104, such as AT 101, receives forward link data from AN 110 via the shared time domain resource, the AT informs the AN of the correct or erroneous reception of the data. In the prior art, an AT informs of the correct or erroneous reception of the data information by conveying an acknowledgment (ACK) or a negative acknowledgment (NAK) back to an AN. However, in the prior art, since each AT in a group of ATs that is receiving forward link data is receiving the data in a same time domain resource, there is a good possibility that the ACK/NAK information conveyed by the ATs back to the AN will be transmitted in a same time slot, resulting in an imbalance in an amount of received power at the AN and excessive interference among the AT transmissions. In order to minimize a quantity of ACK/NAK information conveyed by the members of the group of ATs in a same time slot, communication system 100 provides for a distribution of the ACK/NAK information in the time domain.

Figure 3:
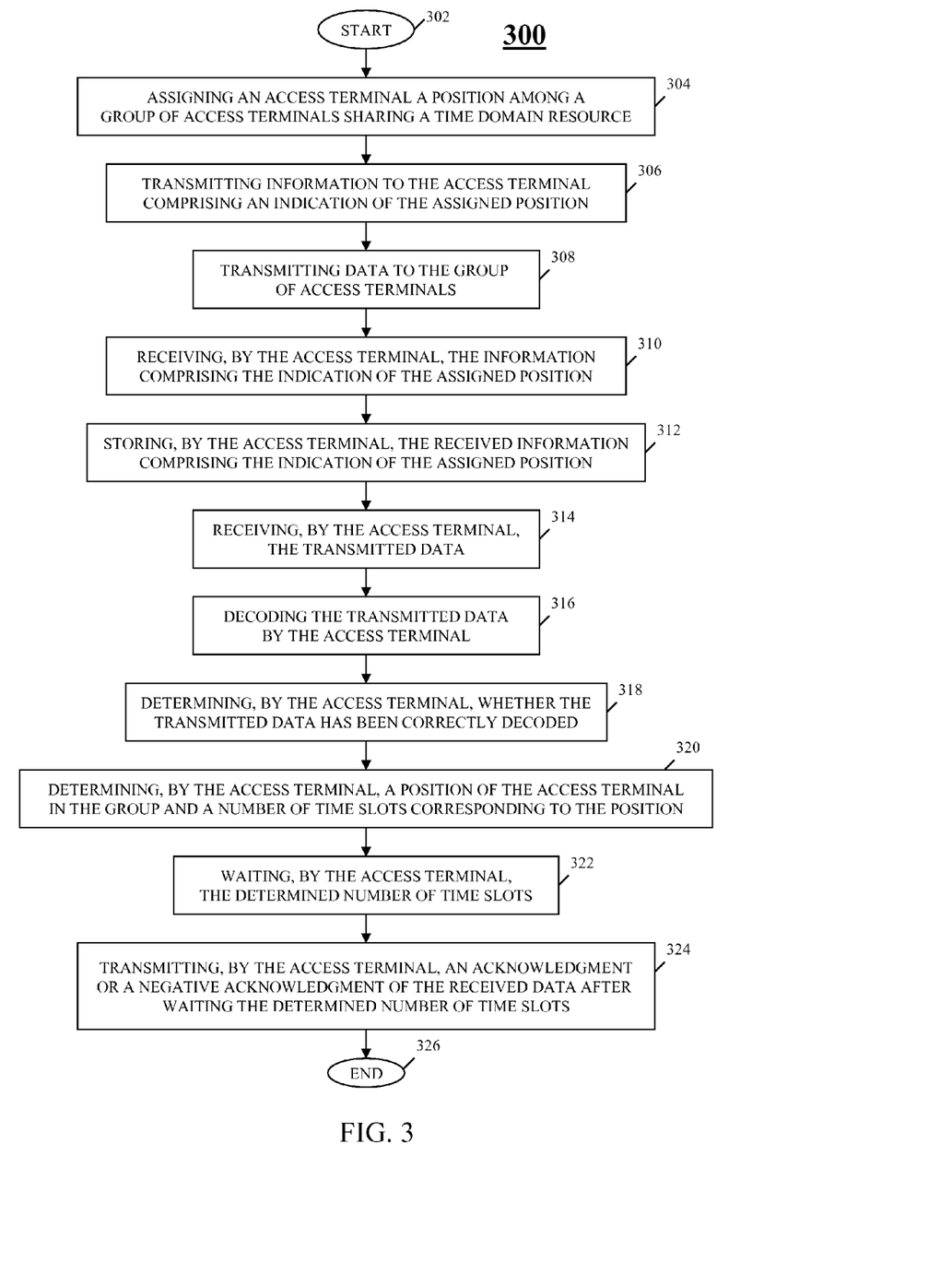
FIG. 3 is a logic flow diagram illustrating an acknowledgment transmission scheme executed by the communication system of FIG. 1 in accordance with various embodiments of the present invention.

Referring now to FIG. 3, a logic flow diagram 300 is provided that illustrates an acknowledgment transmission scheme executed by communication system 100 in accordance with various embodiments of the present invention. Logic flow diagram 300 begins (302) when AN 110 assigns (304) at least one AT, such as AT 101, that is a member of a group of ATs, such as ATs 101-104, a position among the group of ATs. The group of ATs 101-104 share a same time domain resource, such as one or more contiguous time slots that may or may not have a repeating pattern. For example, the assigned time domain resources may comprise an interlace pattern of time slots. AN 110 then transmits (306) information to the at least one AT, that is, AT 101, via a control channel of forward link 142 that comprises an indication of the position assigned to the AT, such as a value associated with the assigned position. AN 110 may transmit the position information to AT 101 as part of, or separate from, the conveyance to the AT of information concerning the group assignment, the assigned shared time domain communication resource, and the portion of the shared time domain resource assigned to the AT.

In one embodiment of the present invention, AN 110 may transmit the position information as list of MAC Indices, where the AT corresponding to the first unique identifier listed is assigned the first position, the AT corresponding to the second unique identifier listed is assigned the second position, etc. For example, the AN may use the header of the multiple user packet to transmit the list of unique identifiers. Alternatively, AN 110 may transmit the list of unique identifiers in the shared control channel of forward link 142. In another embodiment of the present invention, AN 110 may transmit the position information by indexing the set of shared time domain resources. For example, if there are four Walsh codes defined as the shared resource, then the AN may transmit an index to the AT corresponding to the assigned Walsh code. In this case, the position information is the same as the assigned Walsh code index. In another example, if there are four subsets of a set of subcarriers defined as the shared resource, the AN may transmit an index to the AT corresponding to the assigned subset. In this case, the position information is the same as the assigned subset. In both examples, the AN may transmit a unique identifier in addition to the index to identify the targeted AT. In yet another embodiment of the present invention, AN 110 may transmit the position information using bitmap signaling, where each AT corresponds to a location in the bitmap, and the AT corresponding to the first '1' in the bitmap is assigned the first position, the AT corresponding to second '1' in the bitmap is assigned the second position, etc. For example, suppose that AT 101 is assigned bitmap location 1, AT 102 is assigned bitmap location 2, AT 103 is assigned bitmap location 3, and AT 104 is assigned bitmap location 4. If AN 110 transmits bitmap '1001', where a '1' indicates that a resource is being assigned, then the bitmap indicates that AT 101 and AT 104 are assigned resources. In this case, AT 101 is assigned the first resource and therefore first position and AT 104 is assigned the second resource and therefore second position. Other techniques for assigning ATs to a position and indicating said position to ATs may occur to one of ordinary skill in the art and such other techniques may be used herein without departing from the spirit and scope of the present invention.

AN 110 further transmits (308) data to one or more ATs, including AT 101, of the group of ATs 101-104 sharing a time domain resource. Steps 304 and 306 may occur in any order in time, such as concurrently, step 304 first and step 306 second, or step 306 first and step 304 second. AT 101 receives (310) the information comprising an indication of the group position and stores (312) the information in the at least one memory device 220 of the AT. AT 101 further receives (314) the transmitted data, decodes (316) the data, and determines (318) whether the data has been correctly decoded.

In response to receiving the data, AT 101 determines (320) a position of AT 101 in the group and a number of time slots corresponding to the AT's position, for example, N time slots where N is a function of the group position assigned to the AT. In one embodiment of the present invention, AN 110 may determine a position of AT 101 in the group of ATs 101-104 and convey the determined position to AT 101. Step 310 may then comprise receiving the position determined by AN 110 and, at step 320, AT 101 may determine its position to be the received position and determine the number of time slots based on the received position. In another embodiment of the present invention, the position indication received by AT 101 at step 310 may comprise a value to be used by the AT in determining its position, as described in greater detail above, and/or an indication of a function to be used by the AT in determining its position. In such an instance, based on the received position indication, at step 320 AT 101 may determine its position in the group and the corresponding number of time slots based on the position indication received by the AT from AN 110. In yet another embodiment of the present invention, at step 320, AT 101 may determine its position in the group and the corresponding number of time slots based on a value and a function maintained by the AT in the at least one memory device 220 of the AT, as described in greater detail below, and without receiving a position indication from AN 110. AT 101 then waits (322) the determined number of time slots and, after waiting the determined number of time slots, transmits (324) to AN 110, via reverse link 144, acknowledgment information associated with the received data such as an acknowledgment (ACK) when the data is correctly decoded by the AT or a negative acknowledgment (NAK) when the data is erroneously decoded by the AT. Logic flow diagram 300 then ends (326).

Figure 4:
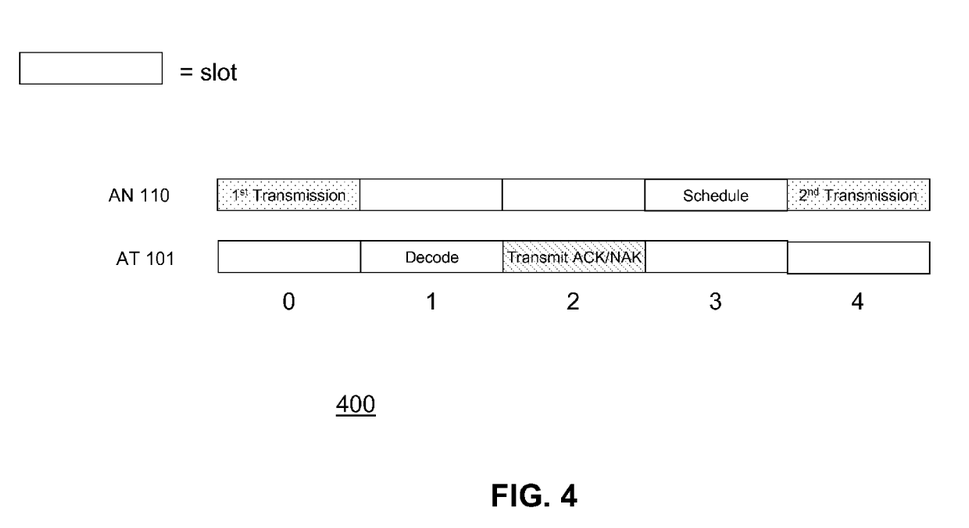
FIG. 4 is an exemplary timing diagram depicting a utilization of time domain resources by the communication system of FIG. 1 in accordance with an embodiment of the present invention.

For example, and merely for the purposes of illustrating the principles of the present invention and not intending to limit the invention in any way, FIG. 4 is an exemplary timing diagram 400 depicting a utilization of time domain resources by communication system 100 in accordance with an embodiment of the present invention. AN 110 transmits a first transmission to an AT, such as AT 101, in time slot 0. Time slot 0 comprises a shared time domain resource as AN 110 may transmit to other ATs, such as any one or more of ATs 102-104 that are included in a same group as AT 101, in time slot 0 as well. AT 101 decodes the received transmission in time slot 1. Next, AT 101 transmits an acknowledgement or negative acknowledgement of the first transmission in time slot 2, which time slot has been assigned to AT 101 for transmission of an acknowledgment based on a position of AT 101 in the group of ATs 101-104. The assignment of time slot 2 to AT 101 is based on the position of AT 101 in the group of ATs 101-104. Then, during time slot 3, AN 110 schedules transmissions for AT 101 in time slot 4.

If AT 101 sent an acknowledgement in time slot 2, then AN 110 may schedule a second, different transmission for AT 101 in time slot 4, and if AT 101 sent a negative acknowledgement in time slot 2, then AN 110 may schedule a second transmission comprising a retransmission of the first transmission for AT 101 in time slot 4. The number of slots between the slot where AN 110 sends the first transmission and the slot when AT 101 transmits its acknowledgment, for example, ACK/NAK, information, and the number of slots between the slot when the AT transmits its acknowledgment information and the slot when the AN may transmit a second transmission, may vary. This pattern may then be repeated for multiple subsequent transmissions.

Figure 5:
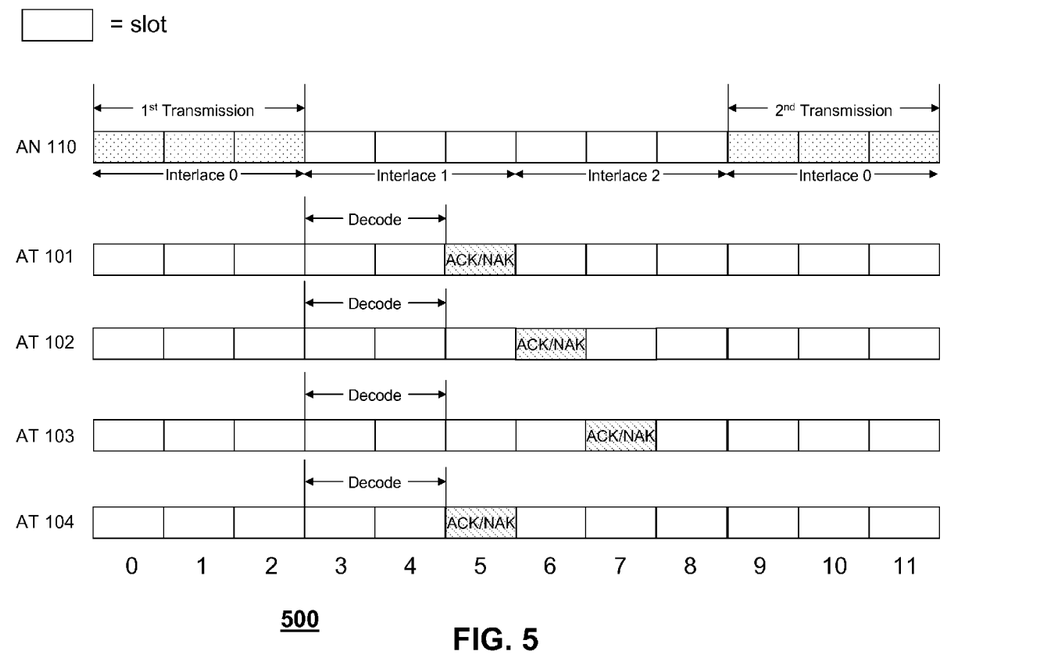
FIG. 5 is an exemplary timing diagram depicting a utilization of time domain resources by the communication system of FIG. 1 in accordance with another embodiment of the present invention.

By way of another example, and again merely for the purposes of illustrating the principles of the present invention and not intending to limit the invention in any way, FIG. 5 is an exemplary timing diagram 500 depicting a utilization of a time domain resources by communication system 100 in accordance with another embodiment of the present invention. In FIG. 5, an interlace pattern with a basic timing of 9 slots is established, where interlace 0 comprises time slots 0-2, 9-11, and so on, interlace 1 comprises time slots 3-5, 12-14, and so on, and interlace 2 comprises time slots 6-8, 15-17, and so on. An interlace pattern is advantageous since transmissions and retransmissions to a particular AT occur in the same interlace. This reduces control channel overhead requirements and allows the AT to enter a reduced power mode in interlaces where the AT is not assigned a data transmission. Since there is a basic timing of 9 slots, there are multiple time slots where the AT can transmit the AT's acknowledgment, for example, ACK/NAK, information while still providing ample time to decode the transmission at the AT and schedule the transmission at the serving AN.

As depicted in FIG. 5, a shared time domain resource comprises the multiple contiguous time slots (slots 0-2, 9-11) used by AN 110 to transmit data to each AT in a group of ATs, that is, ATs 101-104. During or prior to slots 0-2, AN 110, and in particular network controller 130 or wireless transceiver 120, assigns to each AT 101-104 a position in the group of ATs 101-104 and transmits to each AT via a control channel of forward link 142, an indication of the position assigned to the AT, such as a value associated with the position. Again, the control channels may comprise a control channel dedicated to the AT or may comprise a control channel shared by the group of ATs 101-104. For the purpose of illustrating the principles of the present invention and not intending to limit the invention in any way, a first AT 101 of the group of ATs 101-104 may be assigned position 0, a second AT 102 of the group of ATs 101-104 may be assigned position 1, a third AT 103 of the group of ATs 101-104 may be assigned position 2, and a fourth AT 104 of the group of ATs 101-104 may be assigned position 3. In response to receiving the position indication, each AT stores the received information in the at least one memory device 220 of the AT. The position indication corresponds to a time domain resource, for example, a time slot of multiple time slots 5-7, that may be utilized by the AT for transmission of ACK/NAK information.

The group of ATs, that is, ATs 101-104, share time slots 0-2 using one of multiple possible multiple access schemes. For example, ATs 101-104 may share the three time slots depicted in FIG. 5 using a set of four orthogonal codes, such as Walsh codes. By way of another example, ATs 101-104 may share the three time slots using frequency division multiplexing (FDM), time division multiplexing (TDM), spatial division multiplexing (SDM), or using a multiple user packet. In response to receiving data during a first transmission period, that is, time slots 0-2, each of ATs 101-104 independently decodes its received data or the composite multiple user packet in time slots 3-4.

Next, each AT of the group of ATs 101-104 waits a number, N, of time slots to transmit the AT's ACK/NAK information, where N may be different for each AT of the group ATs. In one embodiment, N is an integer greater than or equal to zero (0), and is a function of the AT's position in the group of the ATs, that is, ATs 101-104, sharing slots 0-2. In various embodiments of the present invention, the function may be a modulus function, where one argument of the modulus function is a position of the AT, the other argument of the modulus function is a total number of time slots available for sending acknowledgment information, and the output of the modulus function is N, or a lookup table, where an input of the lookup table is a position of the AT and an output of the lookup table is N, which modulus function and/or lookup table are maintained in the at least one memory device 220 of the AT. In another embodiment of the present invention, the function may be based on a value maintained in the at least one memory device 220 of the AT and used for another purpose by the AT, for example, an electronic serial number, authentication code, a radio parameter, or the like, which value is not dependent on the AT's position in the group. In various other embodiments of the present invention, the function may be a random number generator implemented by the processor 210 of the AT, or any other function dependent on the AT's position in the group of ATs. If the AT uses a function for determining N that is not known by AN 110, such as a function based on a value maintained in the at least one memory device 220 of the AT and used for another purpose by the AT, the AT may share the value of N with the AN in advance through the use of a message, code, control bit, or other means to communicate the information to the AN.

The function used by the AT to determine the AT's position in the group may be maintained in the at least one memory device 220 of the AT or may be indicated to the AT by AN 110 via a transmission on a control channel of forward link 142. Preferably, the function is further maintained by AN 110, that is, is maintained in the at least one memory device 124, 134 of transceiver 120, of network controller 130, or of both. Thus both AN 110 and the AT may agree in advance on the function, or algorithm, for determining N. In this way, the AT knows when to transmit an ACK/NAK information, and the AN knows then to expect ACK/NAK information from a given AT. However, in the case where only the AT maintains the function, or a value used by the function, and does not share the function with AN 110, or does not share a value used in the function and the value is unknown at AN 110, then AN 110 may attempt to receive the ACK/NAK from the AT in each possible time slot.

For example, as depicted in FIG. 5, there are four possible position assignments (0, 1, 2, and 3) for the group of ATs 101-104 and three possible locations for transmitting the ACK/NAK information (N=0, 1, and 2) by the ATs. In this case, N could be defined using the modulus function as $$N=\text{Mod}(\text{Position}, \text{Num\_Possible\_Locations}),$$

where the Position parameter, or argument, corresponds to the assigned position of the AT and the Num_Possible_Locations parameter, or argument, corresponds to the number of possible locations for transmitting the ACK/NAK information. The value assigned to the Position parameter, that is, to the position of the AT in the group of ATs, may be determined based on an index value assigned to the access terminal, wherein the index value corresponds to the portion of the shared time domain resource assigned to the AT, or based on the unique identifier associated with the AT. For example, the shared time domain resource may comprise a set of Walsh codes and the index value may correspond to a particular Walsh Code assigned to the AT or the shared time domain resource may comprise a set of subcarriers and the index value may correspond to a particular subset of subcarriers assigned to the AT. In another embodiment of the present invention, the value assigned to the Position parameter, that is, to the position of the AT in the group of ATs, may be determined based on a position of the AT in a list of ATs included in the group of ATs, for example, where the list of ATs is a list of the unique identifiers associated with each AT in the group of ATs. As described in detail above, such index values and identifiers may be sent by AN 110 to the AT via a control channel of forward link 142.

Using the above equation and recalling that the first AT 101 is assigned position 0, the second AT 102 is assigned position 1, the third AT 103 is assigned position 2, and the fourth AT 104 is assigned position 3, then N=0 for ATs 101 and 104, N=1 for AT 102, and N=2 for AT 103. Based on these values of N, ATs 101 and 104 will transmit their ACK/NAK information in time slot 5, AT 102 will transmit its ACK/NAK information in time slot 6, and AT 103 will transmit its ACK/NAK information in time slot 7, wherein each ACK/NAK is transmitted via reverse link 144. In this manner, the ACK/NAK indications for the group of ATs 101-104 are distributed uniformly in the time domain.

The ACK/NAK information can be transmitted by each AT 101-104 using one of multiple available modulation schemes. For example, the ACK/NAK information can be transmitted using binary phase shift keying (BPSK). By way of another example, the ACK/NAK information can be transmitting using on-off keying. Note that different ATs could use different modulation schemes for transmitting their ACK/NAK information. By way of yet another example, the modulation used for ACK/NAK information may depend on whether multiple user packets are being used or not.

AN 110 then schedules data transmissions for time slots 9-11 during time slot 8. If an AT 101-104 sent a NAK in time slots 5-7, then AN 110 may send a retransmission of the NAK'd transmission in time slots 9-11. This pattern is repeated for subsequent transmissions.

Some ATs may have limited processing capabilities. For example, AN 110 may know that an AT may require M slots to decode a transmission and respond with an ACK/NAK indication. In these cases, AN 110 may assign an AT with limiting process capabilities a group position such that the AT is not required to transmit its ACK/NAK information until it has had sufficient time to decode the transmission. For example and again referring to FIG. 5, if a particular AT requires three total time slots to decode a transmission and respond with an ACK/NAK indication, AN 110 may ensure that this particular AT is assigned to positions 1 or 2 in the group.

Figure 6:
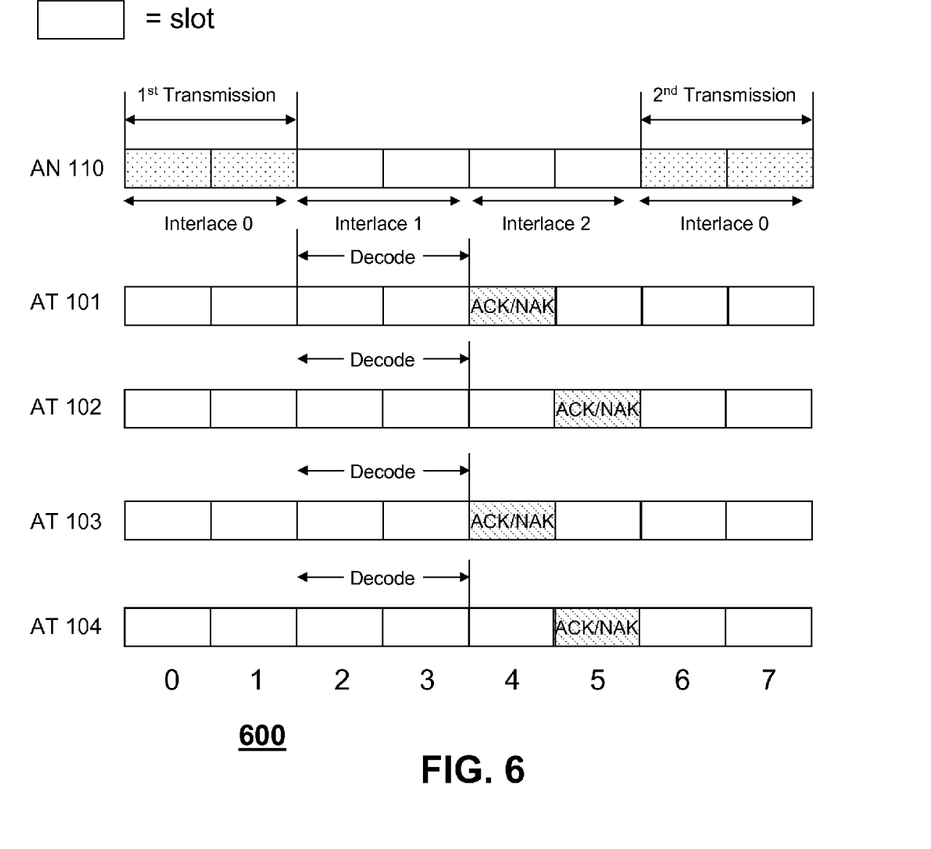
FIG. 6 is an exemplary timing diagram depicting a utilization of time domain resources by the communication system of FIG. 1 in accordance with another embodiment of the present invention.

By way of yet another example, and again merely for the purposes of illustrating the principles of the present invention and not intending to limit the invention in any way, FIG. 6 is an exemplary timing diagram 600 depicting a utilization of a time domain resources by communication system 100 in accordance with yet another embodiment of the present invention. The operation of communication system 100 with respect to FIG. 6 is similar to the operation of communication system 100 described above with respect to timing diagram 500, except that a shared time domain resource comprises the multiple contiguous time slots 0-1 and 6-7, instead of times slots 0-2 and 9-11, and time slots 4 and 5, instead of time slots 5-7, may be utilized by an AT for transmission of ACK/NAK information. Again, a first AT 101 of the group of ATs 101-104 may be assigned position 0, a second AT 102 of the group of ATs 101-104 may be assigned position 1, a third AT 103 of the group of ATs 101-104 may be assigned position 2, and a fourth AT 104 of the group of ATs 101-104 may be assigned position 3. The Num_Possible_Locations parameter is now 2, rather than 3, so that N=0 for ATs 101 and 103 and N=1 for AT 102 and 104. Based on these values of N, ATs 101 and 103 will transmit their ACK/NAK information in time slot 4 and ATs 102 and 104 will transmit its ACK/NAK information in time slot 5. Again, in this manner, the ACK/NAK indications for the group of ATs 101-104 are distributed uniformly in the time domain.

By distributing the acknowledgment transmissions sent by each AT in a group of ATs 101-104 based on a determined position of the AT, communication system 100 provides for a distribution, in the time domain, of acknowledgment transmissions by the group of ATs, which group of ATs share a same time domain resource. The position of the AT may be determined by the AT and/or AN 110, and when determined by the AT may be determined based on values maintained by the AT or conveyed to the AT by AN 110 and/or based on a function indicated by the AN. Based on the determined position of the AT in the group of ATs 101-104, the AT determines a number of time slots corresponding to the AT's position and then transmits an acknowledgment transmission based on the determined number of time slots. Thus, when each AT of a group of ATs receives data in a same shared time domain resource, the acknowledgment transmissions by the multiple ATs may be distributed over multiple time slots in the time domain, with the result that interference among the acknowledgment transmissions and received power at the AN is minimized.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. The terms 'including' and/or 'having', as used herein, are defined as comprising. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions. An element preceded by " . . . a" does not, without more constraints, preclude the existence of additional identical elements in the process, method, article, or apparatus that the element. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for transmitting an acknowledgement comprising:
   determining a position of an access terminal in a group of access terminals sharing a same time domain resource;
   determining a time slot that is N time slots after the shared time domain resource, where N is a function of the position of the access terminal in the group of access terminals; and
   sending an acknowledgment or negative acknowledgement indication associated with the access terminal in the time slot that is N time slots after the shared time domain resource.

2. The method according to claim 1, wherein determining a position comprises determining position of the access terminal in the group of access terminals based on an index value assigned to the access terminal, wherein the index value corresponds to a portion of the shared time domain resource.

3. The method according to claim 2, wherein the shared time domain resource comprises a set of Walsh codes and the index value corresponds to a particular Walsh Code.

4. The method according to claim 2, wherein the shared time domain resource comprises a set of subcarriers and the index value corresponds to a particular subset of the set of subcarriers.

5. The method according to claim 2, further comprising receiving the index value assigned to the access terminal via a control channel.

6. The method according to claim 5, further comprising receiving a unique identifier associated with the access terminal via the control channel.

7. The method according to claim 1, wherein determining a position comprises determining a position of the access terminal in the group of access terminals based on a position of the access terminal in a list of access terminals.

8. The method according to claim 7, wherein the list of access terminals is a list of unique identifiers.

9. The method according to claim 7, wherein the list of access terminals is received in a header of a multiple user packet.

10. The method according to claim 7, further comprising receiving the list of access terminals via a control channel.

11. The method according to claim 1, wherein the function is a modulus function, where one argument of the modulus function is a position of the access terminal, the other argument of the modulus function is a total number of time slots available for sending acknowledgment information, and the output of the modulus function is N.

12. The method according to claim 1, wherein the function is a lookup table, where an input of the lookup table is a position of the access terminal and an output of the lookup table is N.

13. The method according to claim 1, further comprising receiving a message comprising an indication of the function.

14. A method for transmitting an acknowledgement comprising:
   determining a position of an access terminal in a group of access terminals sharing a same time domain resource, wherein determining a position comprises:
     receiving an indication of a location within a bitmap;
     receiving a bitmap, where one of the binary values in each bitmap location represents that a resource has been assigned for an access terminal; and
     determining a position as the summation of a number of access terminals with assigned resources and bitmap locations less than or equal to the location within the bitmap;
   sending an acknowledgment or negative acknowledgement indication in a time slot that is N time slots after the shared time domain resource, where N is a function of the position of the access terminal in the group of access terminals.

15. An access terminal comprising a processor configured to determine a position of the access terminal in a group of access terminals sharing a same time domain resource, determine a time slot that is N time slots after the shared time domain resource, where N is a function of the position of the access terminal in the group of access terminals, and send an acknowledgment or negative acknowledgement indication associated with the access terminal in the time slot that is N time slots after the shared time domain resource.

16. The access terminal according to claim 15, wherein the processor determines a position of the access terminal in the group of access terminals based on an index value assigned to the access terminal, wherein the index value corresponds to one portion of the shared time domain resource.

17. The access terminal according to claim 16, wherein the shared time domain resource comprises a set of Walsh codes and the index value corresponds to a particular Walsh Code.

18. The access terminal according to claim 16, wherein the shared time domain resource comprises a set of subcarriers and the index value corresponds to a particular subset of subcarriers.

19. The access terminal according to claim 16, wherein the access terminal receives the assigned index value via a control channel.

20. The access terminal according to claim 19, wherein the access terminal further receives a unique identifier associated with the wireless receiver.

21. The access terminal according to claim 15, wherein the wherein the processor determines a position of the access terminal in the group of access terminals based on a position of the access terminal in a list of access terminals.

22. The access terminal according to claim 21, wherein the list of access terminals is a list of unique identifiers.

23. The access terminal according to claim 21, wherein the list of access terminals is received in a header of a multiple user packet.

24. The access terminal according to claim 21, wherein the list of access terminals is received via a control channel.

25. The access terminal according to claim 15, wherein the function is a modulus function, where one argument of the modulus function is a position of the access terminal, the other argument of the modulus function is a total number of time slots available for sending acknowledgment information, and the output of the modulus function is N.

26. The access terminal according to claim 15, wherein the function is a lookup table, where an input of the lookup table is a position of the access terminal and an output of the lookup table is N.

27. The access terminal according to claim 15, wherein the access terminal receives a message comprising an indication of the function.

28. An access terminal comprising a processor configured to determine a position of the access terminal in a group of access terminals sharing a same time domain resource, wherein the processor determines a position by receiving an indication of a location within a bitmap, receiving a bitmap, where one of the binary values in each bitmap location represents that a resource has been assigned for an access terminal, and determining a position as the summation of a number of access terminals with assigned resources and bitmap locations less than or equal to the location within the bitmap, and further configured to send an acknowledgment or negative acknowledgement indication in a time slot that is N time slots after the shared time domain resource, where N is a function of the position of the access terminal in the group of access terminals.

* * * * *